Mar. 20, 1923. 1,448,832.
A. DE FRIES.
MACHINE FOR THE WORKING OF SCREW BOLTS AND OTHER CYLINDRICAL OR PRISMATIC PIECES.
FILED NOV. 17, 1919.
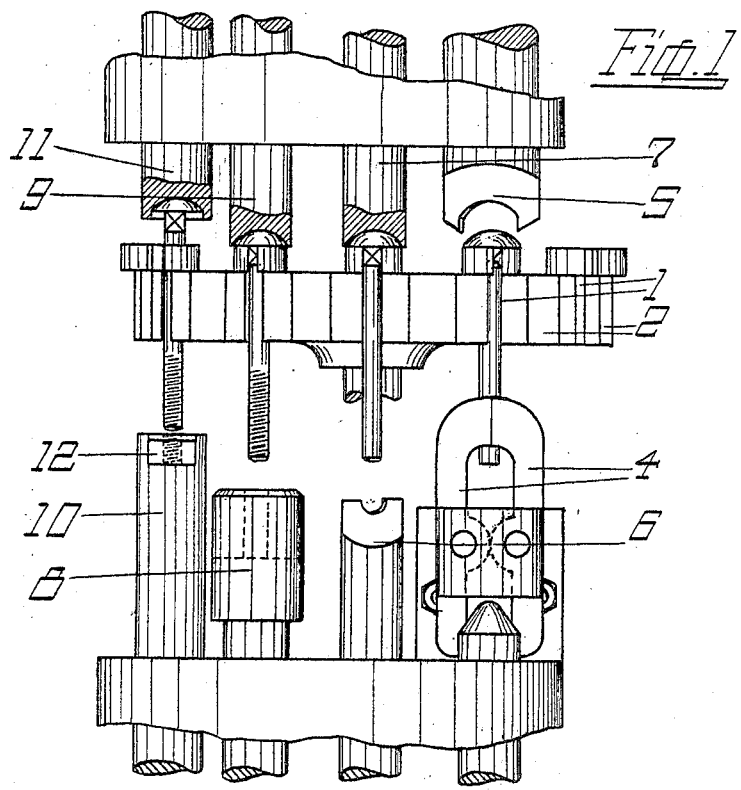
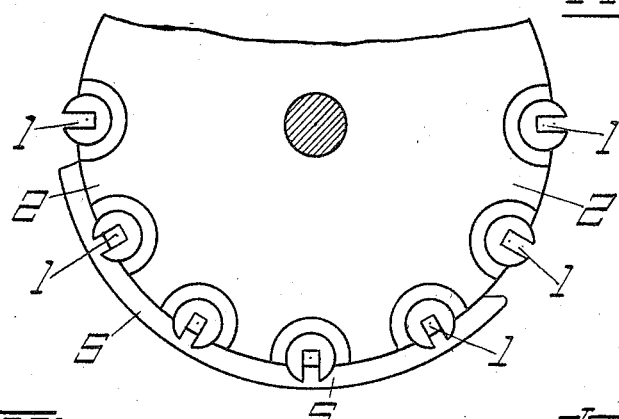

Patented Mar. 20, 1923.

1,448,832

UNITED STATES PATENT OFFICE.

ALFRED DE FRIES, OF KASSEL, GERMANY.

MACHINE FOR THE WORKING OF SCREW BOLTS AND OTHER CYLINDRICAL OR PRISMATIC PIECES.

Application filed November 17, 1919. Serial No. 338,746.

*To all whom it may concern:*

Be it known that I, ALFRED DE FRIES, a citizen of the German Republic, residing at Kassel, Germany, have invented certain new and useful Improvements in Machines for the Working of Screw Bolts and Other Cylindrical or Prismatic Pieces, of which the following is a specification.

The working of screw bolts, that is to say the pointing (rounding off of the end of the shaft) and the cutting of the threads has hitherto required two separate operations on the piece to be worked. With the aid of the known devices it is not possible to execute both operations at the same time.

According to this invention this inconvenience has been overcome by providing a rotatable holder for the bolts to be worked upon and counter-pieces in connection with and opposite the tools designed to act upon the pieces to be worked. The invention does not merely relate to the pointing and cutting of threads but it also permits the removal of the burr formed by the foregoing operation and to put on the nuts, provided the necessary tools are put in.

In the accompanying drawings the invention is shown by way of example:—

Fig. 1 shows diagrammatically the improved machine for the manufacturing of cup head bolts with square necks.

Fig. 2 is a part top or side view of the turning-platform according to whether the platform is arranged vertically or horizontally.

The screw bolts are placed by hand or in any other manner into the incisions 1 of the turning-platform 2, said incisions being made so that they fit with the quadrangular part of the bolt shaft. By turning the platform 2 the screw bolts are brought into centric position between the milling tool 3 which serves for removing the burr of the bolt head and the gripping device 4 which holds the screw shaft during the milling operation. A hold-back 5 prevents the screw bolts from being displaced during the milling operation.

As soon as, after the turning platform 2 has been stopped, the milling tool 3 advances and begins to act upon the bolt head the gripping device closes and securely holds the shaft of the screw bolt.

After the burr has been removed, the milling tool 3 returns to its original position, the gripping device opens and releases the shaft of the screw bolt, whereupon the turning-platform is turned further and the screw bolts are brought to the next following tool 6 for the pointing or rounding off of the shaft end. Opposite the tool 6, an abutment 7 is arranged which prevents the work piece from giving way. The abutment 7 can either be fixed or adjustable with regard to the platform. The adjustable arrangement is preferably used when rough screw bolts are to be worked the heads of which are not of uniform height, as a secure pressing of the head against the turning-platform 2 is desirable during the time when the screw bolts are being worked upon.

After the tool 6 has advanced again and this tool as well as the abutment 7 have been drawn back, the pieces to be worked are brought opposite the thread cutting tool 8 by a further turning of the platform 2, a fixed or adjustable abutment 9 being arranged opposite said tool. After the thread cutting tool 8 has cut the threads into the shaft it releases the screw bolt which is now brought into the next following working position by a further turning of the platform. In this position the nut is screwed upon the bolt As can be seen from the drawing a counter-piece 11 is rotatably mounted opposite a carrying piece 10 and at a distance from the same which is slightly greater than the length of the quadrangular part of the shaft of the screw bolt. The carrying piece 10 presses the nut 12 against the screw bolt which gives way until the quadrangular part has got out of the quadrangular incision 1 of the turning-platform, whereupon the head of the screw bolt, abutting against the counter-piece 11, rotates the bolt, being thus screwed into the nut 12. The screw bolt is finished and is now to be removed from the turning platform after the next following turning movement of the same.

If pieces are to be worked which are constructed otherwise as the screw bolts hereinbefore described, other tools may be used or added such as for example drilling and thread-cutting tools for the interior working of the pieces. With the improved machine one man can turn out in the same time as much work as has been hitherto supplied by 2, 3 or even more men.

I claim:—

1. An improved machine for the working of bolts, comprising in combination a holder for the bolts to be worked upon, said holder being rotatable, a tool for threading the bolts, a tool for screwing on the nuts on the bolts and counter-pieces opposite said tools, said counter-pieces being movable axially with regard to said tools.

2. An improved machine for the working of bolts, comprising in combination a holder for the bolts to be worked upon, said holder being rotatable, a tool for threading the bolts, a tool for screwing on the nuts on the bolts and counter-pieces rotatably mounted opposite said tools.

3. An improved machine for the working of bolts, comprising in combination a holder for the bolts to be worked upon, said holder being rotatable, a tool for pointing the bolts, a tool for threading the bolts, a tool for screwing on the nuts on the bolts and counter-pieces opposite said tools, said counter-pieces being movable axially with regard to said tools.

4. An improved machine for the working of bolts, comprising in combination a holder for the bolts to be worked upon, said holder being rotatable, a tool for pointing the bolts, a tool for threading the bolts, a tool for screwing on the nuts on the bolts and counter-pieces rotatably mounted opposite said tools.

5. Machine for the working of bolts by means of a rotatable holder in which said bolts are located, comprising in combination with said rotatable holder a tool for removing the burr from the head of the bolts, a tool for pointing the bolts and a tool for threading the bolts.

6. An improved machine for the working of bolts, comprising in combination a holder for the bolts to be worked upon, said holder being rotatable, a tool for removing the burr from the head of the bolts, a tool for pointing the bolts, a tool for threading the bolts and a counter-piece opposite said burring-off tool.

7. An improved machine for the working of bolts, comprising in combination a holder for the bolts to be worked upon, said holder being rotatable, a tool for removing the burr from the head of the bolts, a tool for pointing the bolts, a tool for threading the bolts and counter-pieces opposite said tools, said counter-pieces being movable axially with regard to said tools.

8. Machine for the working of bolts by means of a rotatable holder in which said bolts are located, comprising in combination with said rotatable holder, a tool for removing the burr from the head of the bolts, a tool for pointing the bolts, a tool for threading the bolts and a tool for screwing on the nuts on the bolts.

9. An improved machine for the working of bolts, comprising in combination a holder for the bolts to be worked upon, said holder being rotatable, a tool for removing the burr from the head of the bolts, a tool for pointing the bolts, a tool for threading the bolts, a tool for screwing on the nuts on the bolts and counter-pieces opposite said tools.

10. An improved machine for the working of bolts, comprising in combination a holder for the bolts to be worked upon, said holder being rotatable, a tool for removing the burr from the head of the bolts, a tool for pointing the bolts, a tool for threading the bolts, a tool for screwing on the nuts on the bolts and counter-pieces opposite said tools, said counter-pieces being movable axially with regard to said tools.

11. An improved machine for the working of bolts, comprising in combination a holder for the bolts to be worked upon, said holder being rotatable, a tool for removing the burr from the head of the bolts, a tool for pointing the bolts, a tool for threading the bolts, a tool for screwing on the nuts on the bolts and counter-pieces rotatably mounted opposite said tools.

In testimony whereof I affix my signature.

ALFRED DE FRIES.